(12) United States Patent
Lougheed et al.

(10) Patent No.: US 7,699,577 B2
(45) Date of Patent: Apr. 20, 2010

(54) INTERFACE PLATE FOR MOUNTING A LIGHT DUTY ATTACHMENT TO A LIFT ARM ASSEMBLY

(75) Inventors: Christopher W. Lougheed, Litchfield, MN (US); Joseph Fredric Carter, Mandan, ND (US); Matthew Ryan Kettner, Litchfield, MN (US)

(73) Assignee: Clark Equipment Company, West Fargo, ND (US)

( * ) Notice: Subject to any disclaimer, the term of this patent is extended or adjusted under 35 U.S.C. 154(b) by 458 days.

(21) Appl. No.: 11/421,509

(22) Filed: Jun. 1, 2006

(65) Prior Publication Data

US 2007/0280810 A1    Dec. 6, 2007

(51) Int. Cl.
*E02F 9/00* (2006.01)
(52) U.S. Cl. .......................................... 414/723; 37/468
(58) Field of Classification Search .................. 414/723, 414/703; 37/468; 172/272–275
See application file for complete search history.

(56) References Cited

U.S. PATENT DOCUMENTS

| | | | |
|---|---|---|---|
| 2,888,995 A | 6/1959 | Sorensen | |
| 3,285,625 A | 11/1966 | Krueger | |
| 3,417,886 A | 12/1968 | Stuart | |
| 3,672,521 A | 6/1972 | Bauer et al. | |
| 3,876,091 A | 4/1975 | MacDonald | |
| 3,985,249 A | 10/1976 | Aker et al. | |
| 4,030,624 A | 6/1977 | Matthews | |
| 4,119,225 A * | 10/1978 | Macht et al. | 414/723 |
| 4,307,992 A | 12/1981 | Robnett | |
| 4,586,867 A * | 5/1986 | Stafford | 414/723 |
| 4,708,579 A | 11/1987 | Baird et al. | |
| 4,812,103 A * | 3/1989 | Cochran et al. | 414/723 |
| 4,824,319 A * | 4/1989 | Arnold | 414/723 |

(Continued)

FOREIGN PATENT DOCUMENTS

AT    379048    11/1985

(Continued)

OTHER PUBLICATIONS

Extended European Supplementary Search Report dated Apr. 1, 2008 for European Application No. 07 25 2146.

(Continued)

*Primary Examiner*—Donald Underwood
(74) *Attorney, Agent, or Firm*—Leanne Taveggia Farrell; Westman, Champlin & Kelly, P.A.

(57) ABSTRACT

An attachment arm assembly includes an attachment arm that is pivotal about an arm pivot axis using a hydraulic lift cylinder. The attachment arm assembly also includes an interface plate pivotal about an interface plate pivot axis and configured to mount a tool. The interface plate has a main body and includes a first side edge having a first end and a second end. The interface plate includes a second side edge having a first end and a second end. The interface plate also includes a top edge that couples the second end of the first side edge to the second end of the second side edge. The first ends of the first and second side edge are spaced apart from each other a distance greater than a distance between the second ends of the first and second side edges.

12 Claims, 9 Drawing Sheets

U.S. PATENT DOCUMENTS

| | | |
|---|---|---|
| 4,984,957 A | 1/1991 | Noguchi et al. |
| 5,078,569 A | 1/1992 | Cook |
| 5,082,065 A | 1/1992 | Fletcher |
| 5,310,275 A * | 5/1994 | Lovitt ............... 403/322.3 |
| 5,419,673 A | 5/1995 | Merhar |
| 5,466,113 A | 11/1995 | Norberg |
| 5,685,689 A | 11/1997 | Schneider et al. |
| 5,692,855 A | 12/1997 | Burton |
| 5,743,339 A | 4/1998 | Alexander, III |
| 5,950,735 A | 9/1999 | Godbersen |
| 6,925,735 B2 | 8/2005 | Hamm et al. |
| 7,001,136 B2 | 2/2006 | Perrin et al. |
| 7,001,137 B2 | 2/2006 | Perrin et al. |
| 2004/0041415 A1 | 3/2004 | Hamm et al. |

FOREIGN PATENT DOCUMENTS

| | | |
|---|---|---|
| EP | 0 197 026 A2 | 10/1986 |
| EP | 1 103 171 A1 | 11/2000 |
| EP | 1353011 | 10/2003 |
| JP | 06 272273 | 9/1994 |
| WO | 8102086 | 8/1981 |
| WO | 2004007851 | 1/2004 |
| WO | 2006036103 A1 | 4/2006 |

OTHER PUBLICATIONS

European Search Report dated Sep. 17, 2007.

* cited by examiner

US 7,699,577 B2

INTERFACE PLATE FOR MOUNTING A LIGHT DUTY ATTACHMENT TO A LIFT ARM ASSEMBLY

BACKGROUND OF THE INVENTION

The present invention relates to a self-propelled vehicle having a front lift arm assembly. More particularly, the present invention relates to a utility vehicle with an attachment arm assembly having an interface plate configured for mounting a light duty attachment or tool.

A utility vehicle includes a frame attached to an operator compartment such as a cab. A cargo support is attached to the frame behind the cab. An attachment arm assembly is attached to the frame generally in front of the cab and centered on a longitudinal center line of the utility vehicle. The attachment arm assembly is movable with respect to the frame and can be attached to one or more work tools such as a bucket. The utility vehicle is suited for use in operating in a variety of different tasks. Utility vehicles are generally vehicles that can provide a versatile amount of uses.

Often times it is necessary to attach a variety of different work tools to the front of a utility vehicle to operate in a variety of different tasks. However, the compact size of a utility vehicle requires that an interface that attaches a variety of different work tools also be compact as well as easy to use. Interface designs on large work machines are not well suited for the compact nature of a utility vehicle.

SUMMARY OF THE INVENTION

The present invention is directed to a self-propelled, work vehicle having an attachment arm assembly pivotably coupled to a front of a frame assembly at a frame pivot. The attachment arm assembly includes a pair of spaced-apart attachment arms coupled to an interface plate for mounting a tool to the work vehicle.

The tool has an interface receiving member. The interface receiving member includes a pair of first and second side flanges having first and second ends. The interface receiving member also includes a top flange that couples the second end of the first side flange to the second end of the second side flange. The first ends of the first and second side flanges are spaced apart from each other a distance that is greater than a distance between the second ends of the first and second side flanges.

The interface plate includes a first side edge having a first end and a second end. The first side edge corresponds with the first side flange of the interface receiving member. The interface plate also includes a second side edge having a first end and a second end. The second side edge corresponds with the second side flange of the interface receiving member. The interface plate also includes a top edge that corresponds with the top flange of the interface receiving member and couples the second end of the first side edge to the second end of the second side edge. The first ends of the first and second side edge are spaced apart from each other a distance greater than the second ends of the first and second side edges.

DETAILED DESCRIPTION OF THE PREFERRED EMBODIMENTS

The present invention is described in the context of a self-propelled, wheeled utility vehicle. However, it should be noted that the present invention can be used in connection with other types of work vehicles other than utility vehicles. For example, the present invention can be used in an all terrain vehicle or other types of small work vehicles.

Figure 1:
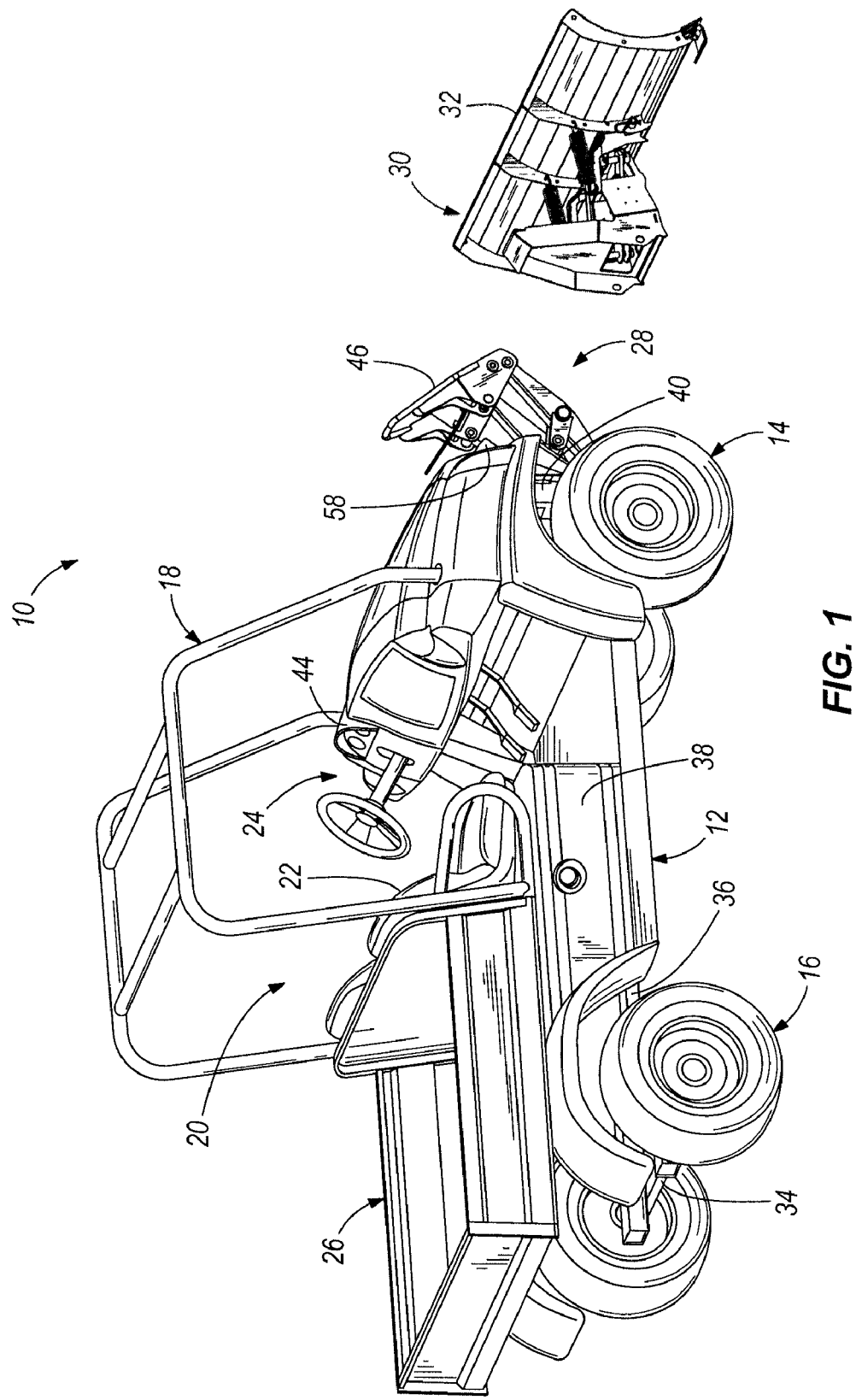
FIG. 1 illustrates a perspective view of a utility vehicle.

FIG. 1 illustrates a perspective view of an exemplary utility vehicle 10. The utility vehicle 10 includes a frame 12 supported with front and rear wheel assemblies 14, 16 respectively. The frame 12 is attached to a cab 18 that defines an operator compartment 20 having an operator platform, and a seat 22, and operator controls 24. The utility vehicle also includes an engine, not shown, typically disposed between the seat 22 and the rear wheel assembly 16 and attached to the frame 12. The frame 12 also is connected to a cargo support 26, which is disposed behind the seat 22 in the example. An attachment arm assembly 28 is positioned in front of the seat 22 and attached to the front portion of frame 12. The attachment arm assembly 28 is adapted to receive a removable tool 30, such as a blade 32 shown removed in FIG. 1.

In a typical example, the frame 12 is a rigid frame assembly that provides generally no frame articulation between the front and rear wheel assemblies 14, 16. The frame 12 is illustrated as including longitudinal members 34 extending from the front wheel assembly 14 toward the rear wheel assembly 16. The frame includes a cargo support portion 36, a middle portion 38, and an attachment arm support portion 40. The attachment arm support portion 40 is particularly strengthened to resist bending or twisting from loads carried with attachment arm assembly 28. The middle portion 38 is adapted to provide a stable mount for the cab 18 and can be suited to accommodate a transverse mounted engine.

The engine can power either or both of the wheel assemblies 14, 16 to move the utility vehicle 10. The engine is connected to one or both of the wheel assemblies 14, 16, with mechanical drives, hydraulic motors or other suitable devices for power transmission. The wheel assemblies 14, 16 can include suspension systems coupled to the frame 12. A steering linkage can be coupled to the front wheels, rear wheels, or both. Controls 24 for the operation of the utility vehicle 10 are mounted in the operator compartment 20.

The operator compartment 20 includes an instrument cluster and dash 44 generally disposed in front of the seat 22, and includes gauges, controls and the like useful for comfort of the operator and operation of the work machine 10. The seat 22 can include one or more bucket seats or a common bench seat for two or more riders.

FIG. 1 also shows the attachment arm assembly 28 connected to the attachment arm support portion 40 of the frame 12. The remote end of the attachment arm assembly 28 can be connected to an interface plate 46 that provides an interface for attaching to various tools 30. Such tools 30 can include blades, buckets, grapples, brooms, augers, pallet forks or other tools. The attachment arm assembly 28 is coupled to the frame 12 in such a manner that it can be moved with respect to the frame 12. Movement of the attachment arm assembly 28 is effected through the use of hydraulic actuators or other types of mechanical or electrical actuators that receive power from the engine.

Figure 2:
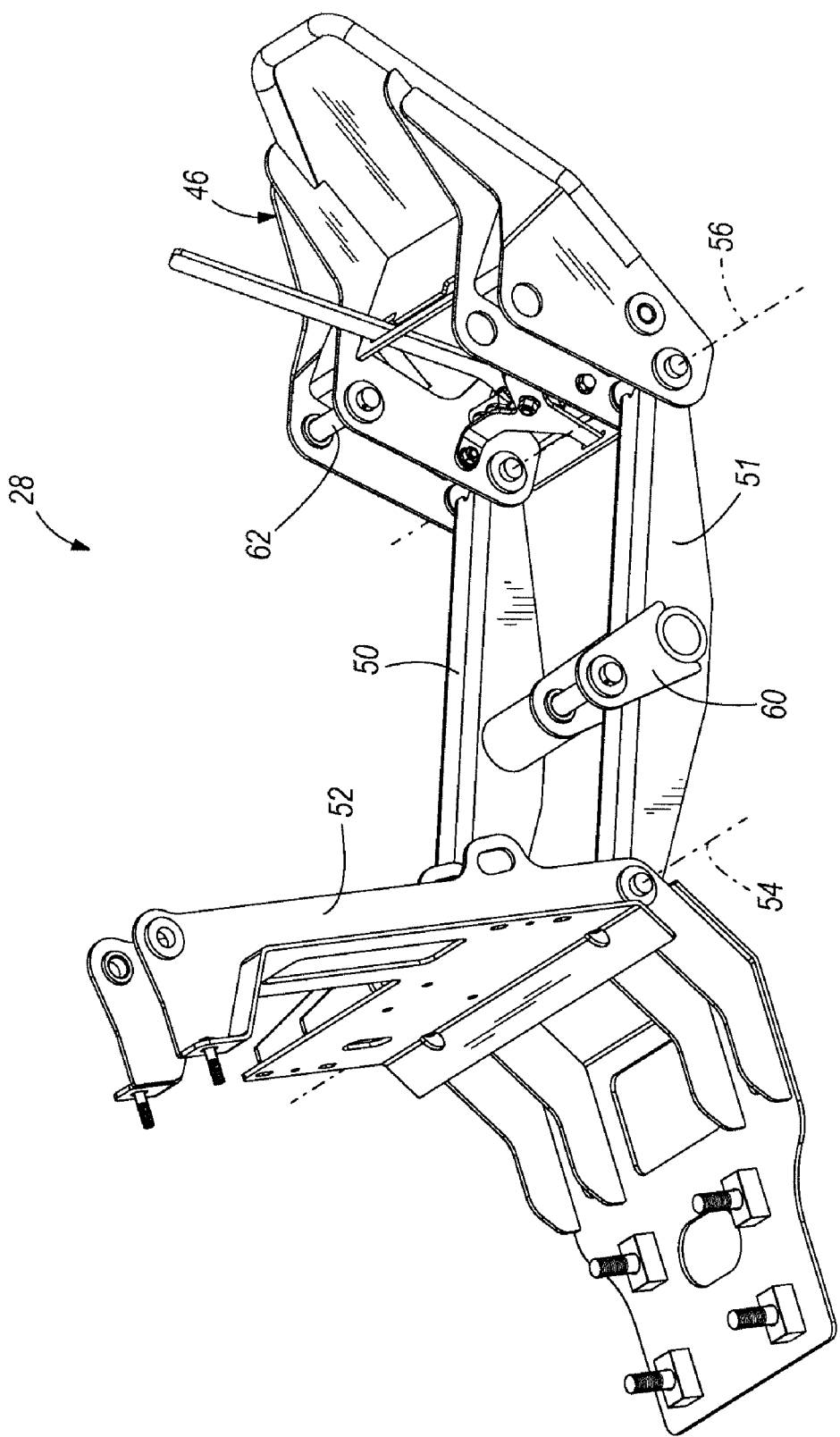
FIG. 2 illustrates a detailed view of an attachment arm assembly.

FIG. 2 is a more detailed view of the attachment arm assembly 28 shown decoupled from the frame 12. The attachment arm assembly 28 includes a pair of arms 50 and 51, an arm support portion 52 and interface plate 46. The pair of arms 50 and 51 are joined together by a cross member and are pivotally coupled about an arm pivot axis 54 of an arm support portion 52 at one end of the arms 50 and 51. Arms 50 and 51 are pivotally coupled about of interface plate pivot axis 56 on interface plate 46 at the other end of arms 50 and 51.

Attachment arm assembly 28 also includes a lift cylinder (not illustrated) and a tilt cylinder 58 (illustrated in FIG. 1). The lift cylinder is generally positioned between arm support portion 52 and lift cylinder support 60. Tilt cylinder 58 is generally positioned between arm support portion 52 and cross-member 62 on interface plate 46. The lift cylinder lifts alms 50 and 51 about arm pivot axis 54 and tilt cylinder 58 tilts interface plate 46 about interface plate pivot axis 56. In the exemplary utility vehicle 10, the lift cylinder (not illustrated) and tilt cylinder 58 are hydraulic cylinders that each include a body or cylinder portion and an extensible rod. The cylinders are actuated with operator controls and powered by the engine. It should be noted, however, utility vehicle 10 can lift arms 50 and 51 about arm pivot axis 54 and tilt interface plate 46 about interface plate pivot axis 56 with other types of mechanical or electrical actuators other than hydraulic cylinders.

Figure 3:
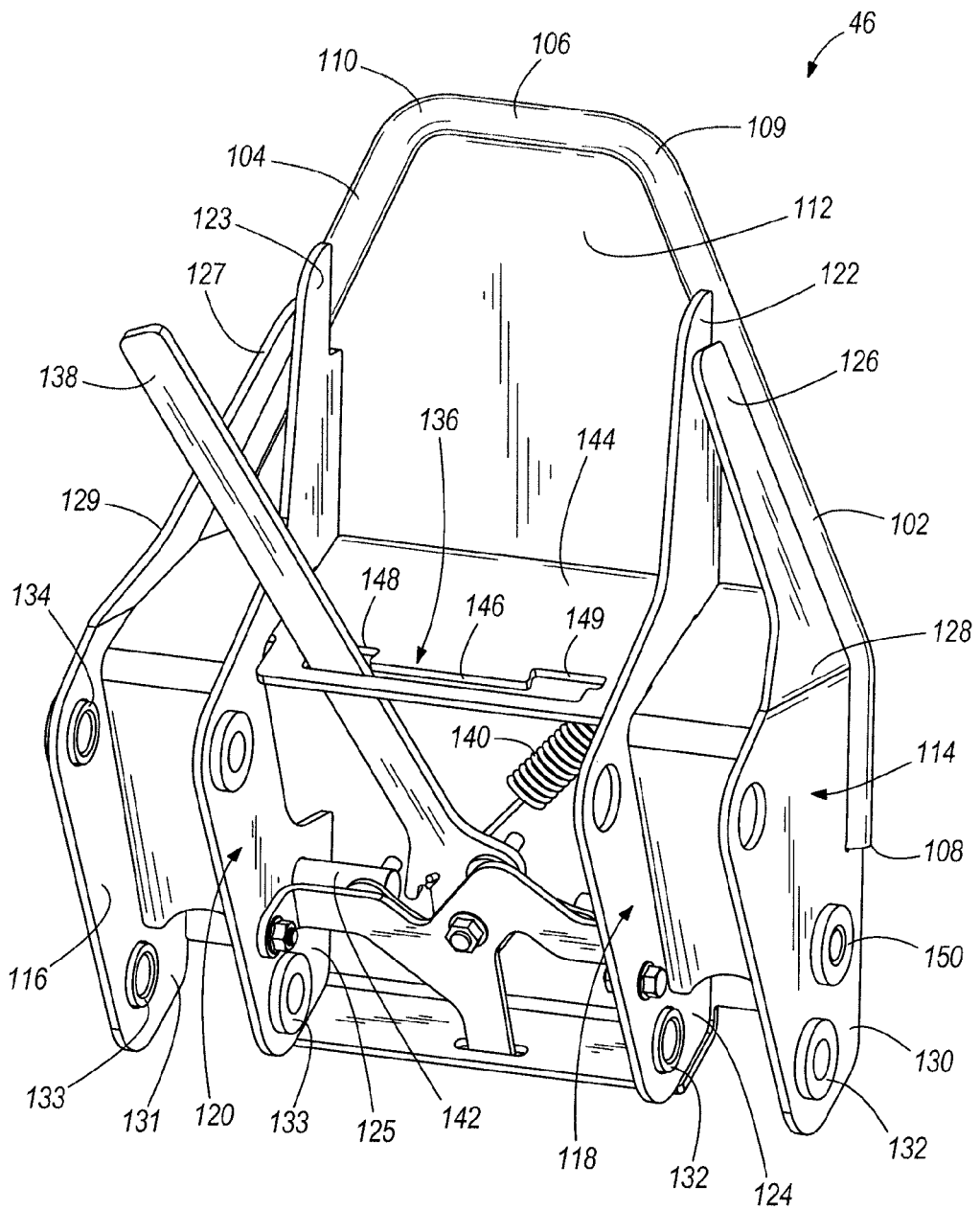
FIG. 3 illustrates a detailed view of an interface plate in an unlocked position.

FIG. 3 illustrates a more detailed view of interface plate 46. Interface plate 46 is configured to mount a tool to attachment arm assembly 28 of work machine 10. Interface plate 46 is also configured to dismount a tool from attachment arm assembly 28. Interface plate 46 can mount a variety of different tools as discussed and noted above. When interface plate 46 mounts or attaches a tool, it engages with the tool in an unlocked position and then actuates into a locked position to retain the tool. When interface plate 46 disengages from a tool, it actuates into an unlocked position and the tool is removed.

In the embodiment illustrated in FIG. 3 interface plate 46 is configured in an unlocked position. Interface plate 46 includes a first side edge 102, a second side edge 104 and a top edge 106. The first side edge 102 includes a first end 108 and a second end 109. The second side edge 104 includes a first end (not shown in FIG. 3) and a second end 110. Second end 109 of first side edge 102 is integrally coupled to one end of top edge 106 and second end 110 of second side edge 104 is integrally coupled to the other end of top edge 106. First side edge 102, second side edge 104 and top edge 106 integrally form a cylindrical bar that surrounds a main body 112 of interface plate 46. First side edge 102 from first end 108 to second end 109 and second side edge 104 from the first end to second end 110 both span a distance that ranges from approximately 8 inches to 12 inches. In particular, the distance between first end 108 and second end 109 is approximately 10.5 inches. Top edge 106 has a length that ranges between approximately 3 inches and 6 inches. In particular, the length of top edge 106 is approximately 4.75 inches. The length of top edge 106 is equivalent to a distance between second end 109 and second end 110.

First end 108 of first side edge 102 and the first end of second side edge 104 are spaced apart from each other a distance greater than a distance between second end 109 of first side edge 102 and second end 110 of second side edge 104. The distance between first end 108 of first side edge 102 and the first end of second side edge 104 ranges between approximately 11 and 15 inches. In particular, the distance between first end 108 of first side edge 102 and the first end of second side edge 104 is approximately 13.5 inches. The distance between first end 108 of first side edge 102 and the first end of second side edge 104 is between approximately 2.5 and 3 times greater than the distance between second end 108 of first side edge 102 and second end 110 of second side edge 104. Such relative distances provide main body 112 with a shape that is tapered at top edge 106 and broadened at first end 108 of first side edge 102 and the first end of second side edge 104.

Interface plate 46 also includes a first outer flange 114 and a second outer flange 116. First outer flange 114 is coupled to first side edge 102 and second outer flange 116 is coupled to second side edge 104. Positioned between first outer flange 114 and second outer flange 116 are a first inner flange 118 and a second inner flange 120. First inner flange 118 is coupled to first side edge 102 at an upper portion 122 and second inner flange 120 is coupled to second side edge 104 at an upper portion 123. From upper portions 122 and 123, first and second inner flanges 118 and 120 extend substantially parallel with each other to lower portions 124 and 125, respectively. First outer flange 114 is coupled to first side edge 102 at an upper portion 126 and second outer flange 116 is coupled to second side edge 104 at an upper portion 127. From upper portions 126 and 127, first and second outer flanges 114 and 116 extend along first and second side edges 102 and 104, respectively, until middle portions 128 and 129 of first and second outer flanges 114 and 116. At middle portions 128 and 129, first and second outer flanges 114 and 116 run substantially parallel with each other and substantially parallel with first and second inner flanges 118 and 120 to lower portions 130 and 131 of first outer flange 114 and second outer flange 116, respectively. First inner flange 118 is positioned in closer proximity to first outer flange 114 than second outer flange 116. Second inner flange 120 is positioned in closer proximity to second outer flange 116 than first outer flange 114.

Lower portion 130 of first outer flange 114 and lower portion 124 of first inner flange 118 each include mounting apertures 132. Apertures 132 are configured to receive a cross-member for mounting arm 51 (FIG. 2) of attachment arm assembly 28 (FIG. 1 and 2) to interface plate 46. Lower portion 131 of second outer flange 116 and lower portion 125 of second inner flange 120 each include mounting apertures 133. Apertures 133 are configured to receive a cross-member for mounting arm 50 (FIG. 2) of attachment arm assembly 28. Above lower portions 131 and 125, each of second outer flange 116 and second inner flange 120 include another set of apertures 134. Apertures 134 are configured to receive a cross-member for mounting tilt cylinder 58 (FIG. 1) of attachment arm assembly 28 to interface plate 46.

Between first inner flange 118 and second inner flange 120, interface plate 46 includes a locking mechanism 136. Locking mechanism 136 includes a lever 138, a spring 140, a pair of pins 142 (of which one is illustrated in FIG. 3) and a guide plate 144. Guide plate 144 includes a slot 146 having a first catch feature 148 at one end of the slot and a second catch feature 149 at the other end of the slot.

In general and as illustrated in FIG. 3, spring 140 is coupled to lever 138 as well as pins 142. In FIG. 3, locking mechanism 136 is in an unlocked position. In this position, pins 142 do not protrude through apertures 150. Pins that do not protrude through apertures 150 (of which one is shown in FIG. 3) do not interfere with a tool. Since spring 142 is biased in a locked position, lever 138 is constrained by first catch feature 148 of slot 146 such that pins do not protrude through apertures 150.

Figure 4:
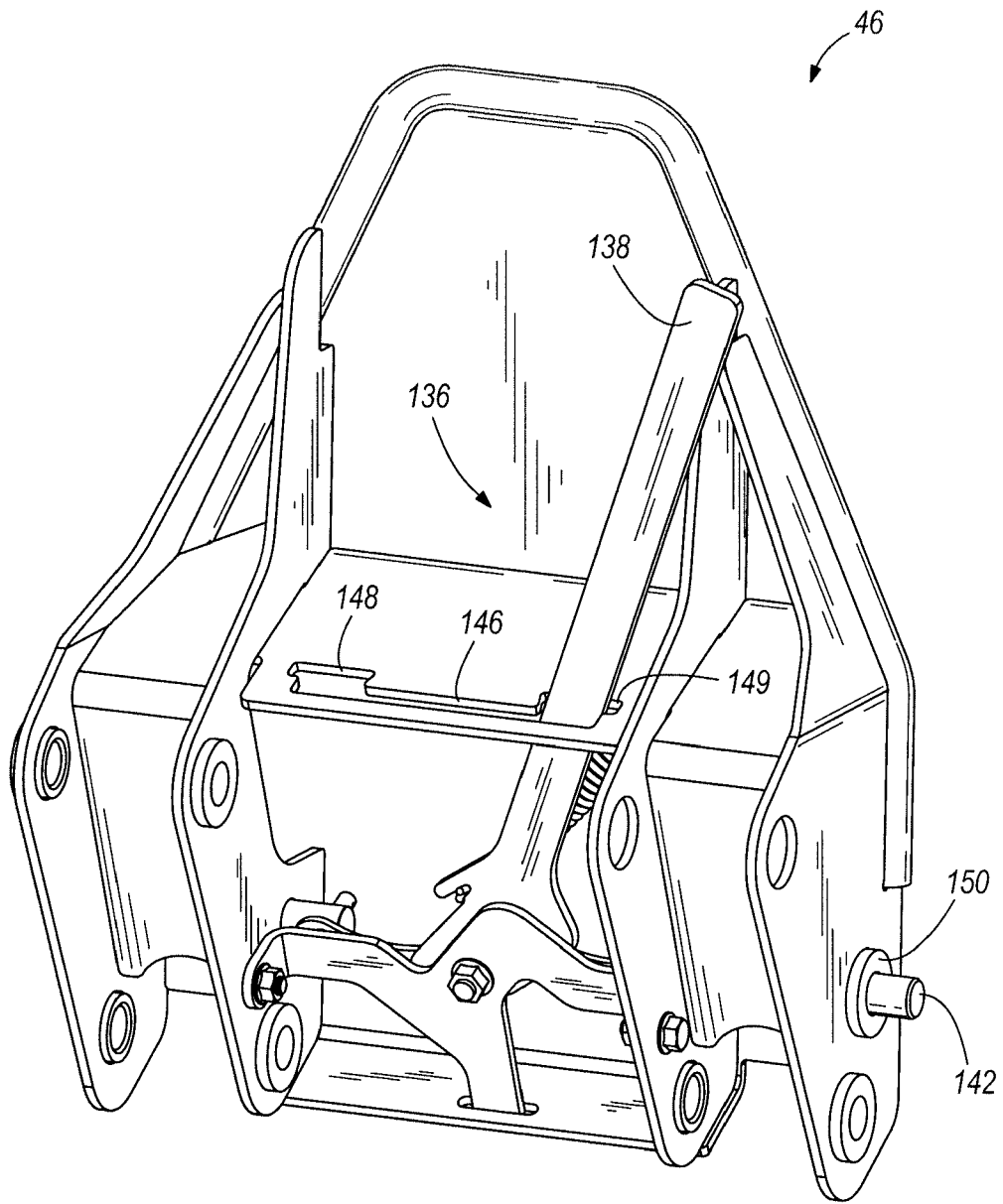
FIG. 4 illustrates the interface plate of FIG. 3 in an locked position.

FIG. 4 illustrates interface plate 46 in a locked position. To actuate interface plate 46 into a locked position from an unlocked position, lever 138 is slid long slot 146 and made to be constrained in second catch feature 149. In such a locked position, pins 142 extend outwardly from apertures 150 (of which one is shown in FIG. 4). Locking mechanism 136 can be manually actuated applying a force to lever 138 to extend pins 142 outwardly, however, locking mechanism 136 can also be actuated with other mechanical or electro-mechanical actuators to extend pins 142 outwardly. Although spring 140 is biased to retain interface plate 46 in a locked position or with pins extended, second catch feature 149 is utilized to ensure that lever 138 does not slip from its locked position.

Figure 5:
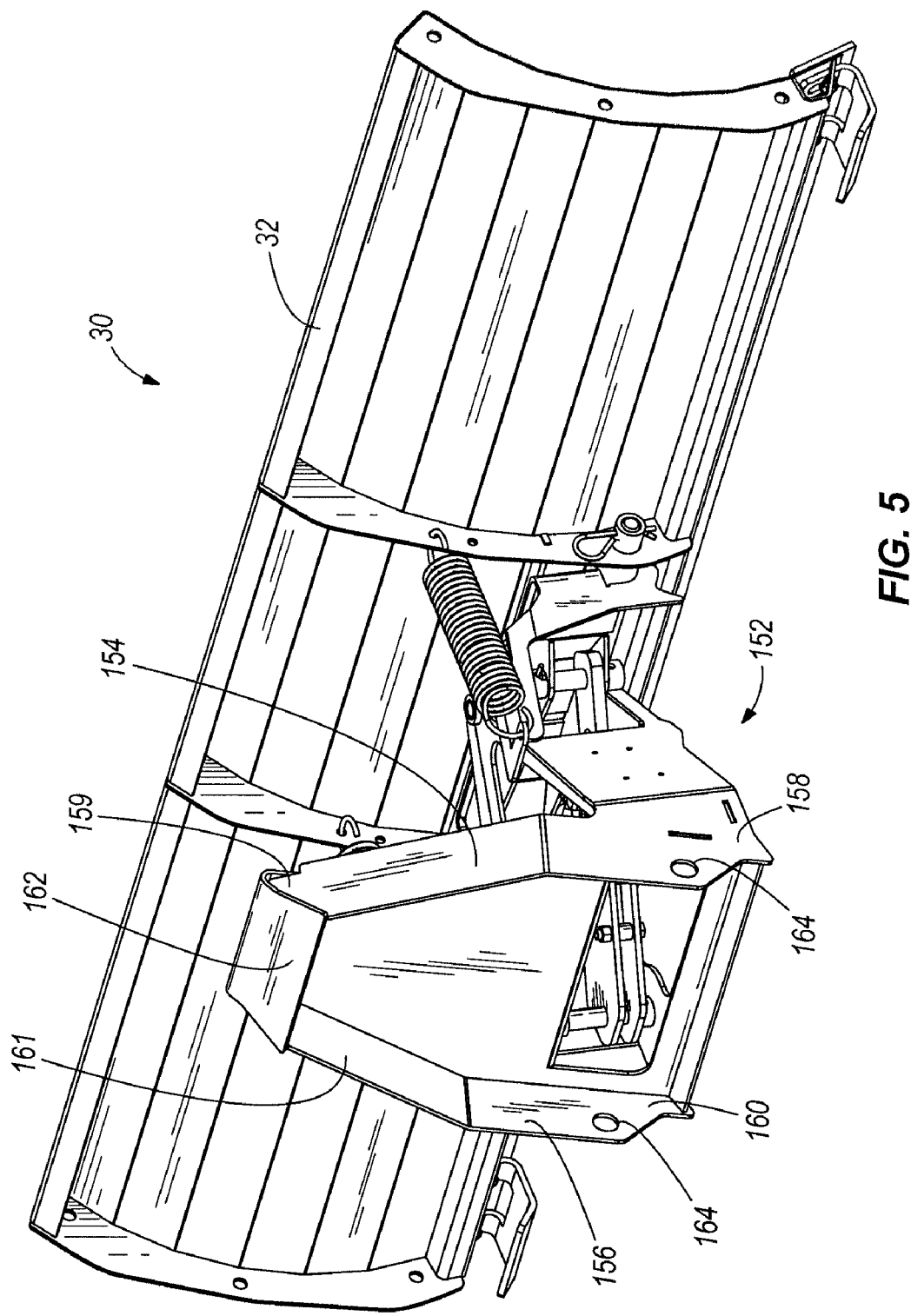
FIG. 5 illustrates a detailed view of a tool.

FIG. 5 illustrates a more detailed view of tool 30. FIG. 5 is an illustrative embodiment of a tool and in this example is a blade 32. Tool 30 includes an interface receiving member 152. Interface receiving member 152 includes a first side flange 154 and a second side flange 156. First side flange 154 includes a first end 158 and a second end 159. Second side flange 156 includes a first end 160 and a second end 161. Interface receiving member 152 also includes a top flange 162.

Second end 159 of first side flange 154 is coupled to one end of top flange 162. Second end 161 of second side flange 156 is coupled to the other end of top flange 162. First end 158 of first side flange 154 and first end 160 of second side flange 156 are spaced apart from each other a distance greater than a distance between second end 159 of first side edge 154 and second end 161 of second side flange 156. Such relative distances provide interface receiving member 152 with a shape that is tapered at top flange 162 and broadened at first ends 158 and 160 of first and second side flanges 154 and 156. The tapered shape and dimensions of interface receiving member 152 correspond with the tapered shape and dimensions of main body 112 (FIG. 3) of interface plate 46 (FIGS. 3 and 4). Corresponding tapered shapes allow interface receiving member 152 to receive main body 112 of interface plate 46. Upon mounting tool 30 to interface plate 46, side edges 102 and 104 will be proximate side flanges 154 and 156 and top edge 106 will be proximate top flange 162.

First and second side flanges 154 and 156 of interface receiving member 152 each include an aperture 164 located near first ends 158 and 160. Apertures 164 are aligned with each other and are configured to receive pins 142 (FIGS. 3 and 4) of locking mechanism 136 (FIGS. 3 and 4) upon their extension from apertures 150 of interface plate 46. Upon apertures 164 receiving pins 142, interface plate 46 is mounted and locked with interface receiving member 152 of tool 30. Although not specifically illustrated, in an alternative embodiment, interface plate 46 does not include a locking mechanism. Instead, a single pin is inserted through both apertures 164 of interface receiving member 152 and through apertures 150 of interface plate 46. The single pin can lock interface plate 46 to a tool 30.

Figure 6:
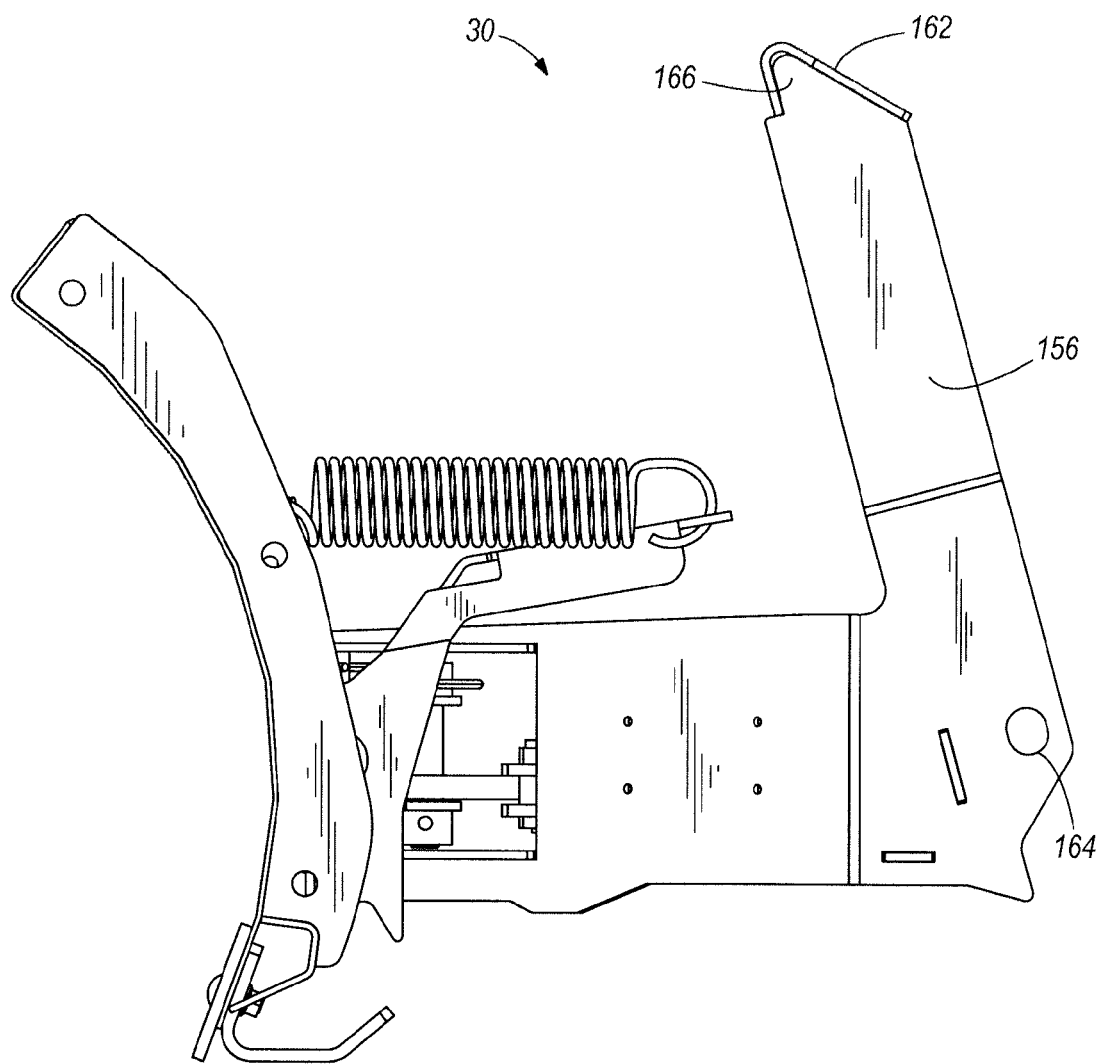
FIG. 6 illustrates a side view of the tool illustrated in FIG. 5.

FIG. 6 illustrates a side view of tool 30. In FIG. 6, second side flange 156, top flange 162 and one of the apertures 164 for receiving pins 142 (FIGS. 3 and 4) of locking mechanism 136 (FIGS. 3 and 4) are illustrated. As illustrated more clearly in FIG. 6, top flange 162 forms a pocket 166 with the first side flange (not illustrated in FIG. 6) and second side flange 156. Pocket 166 is configured to receive top edge 106 of the integral cylindrical bar of interface plate 46. In a sense, pocket 166 surrounds the cylindrical bar of top edge 106 to more easily mount interface plate 46 with interface receiving member 152.

Figure 7A:
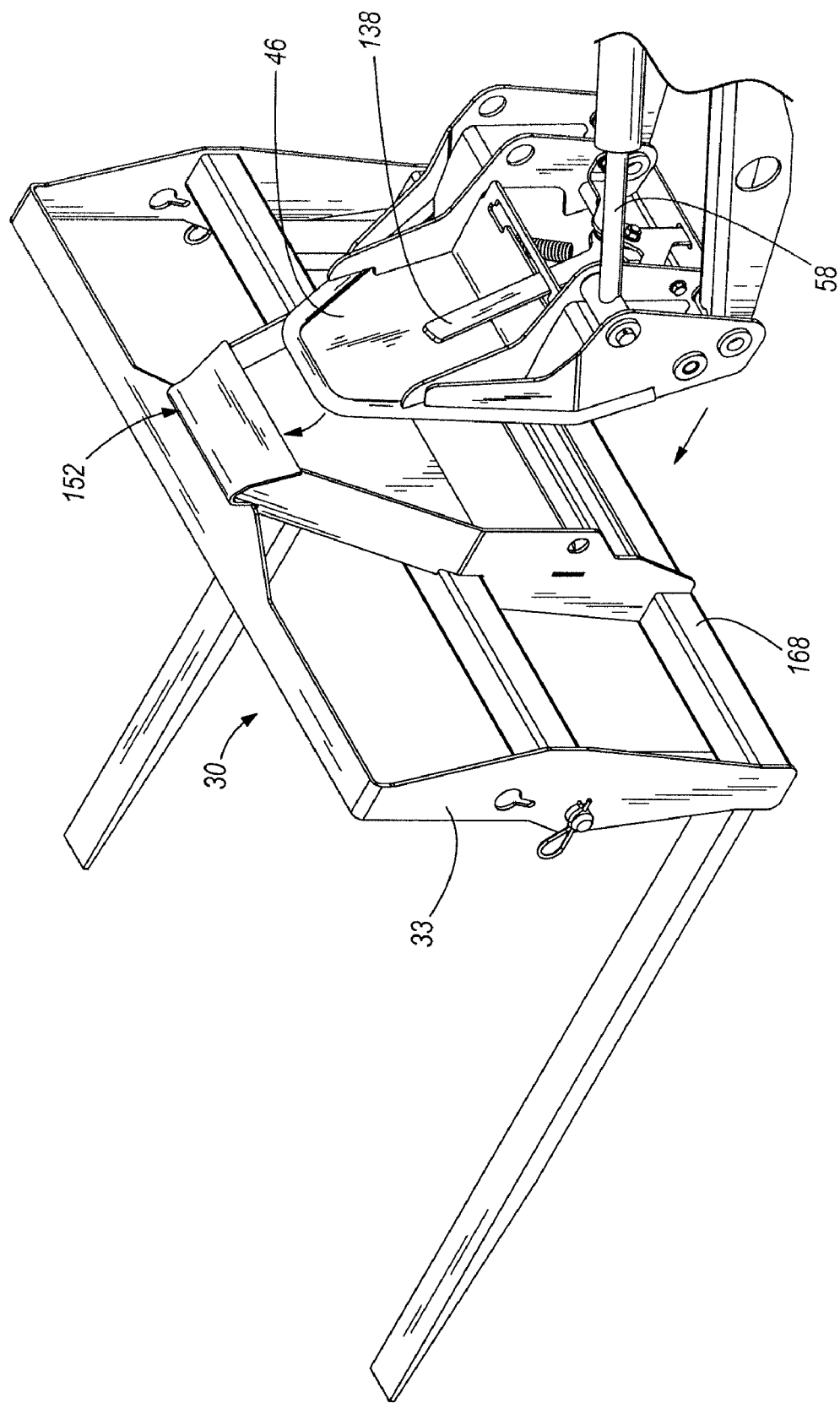
FIGS. 7A through 7C illustrate the process of mounting a tool to an interface plate.
Figure 7B:
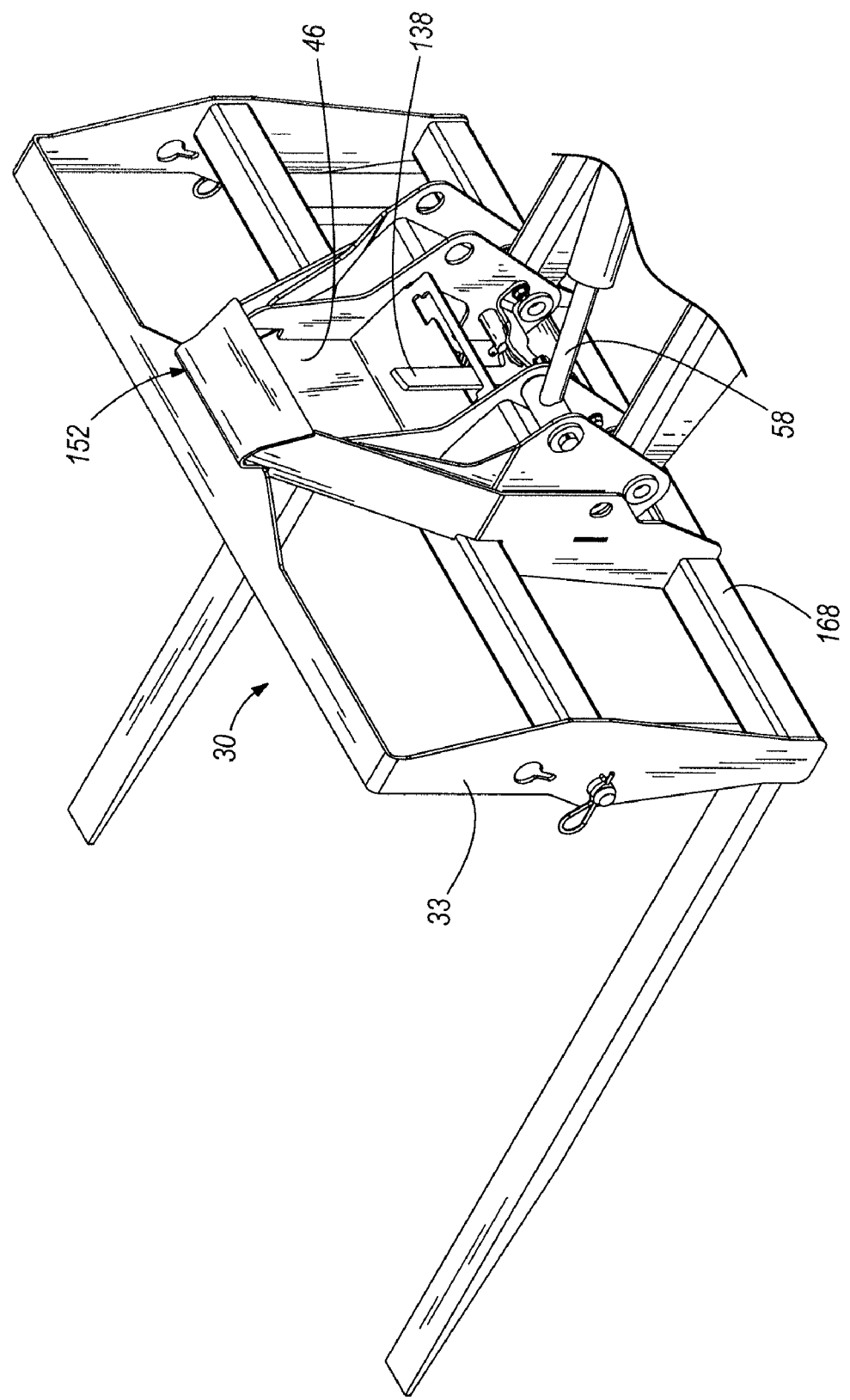
Figure 7C:
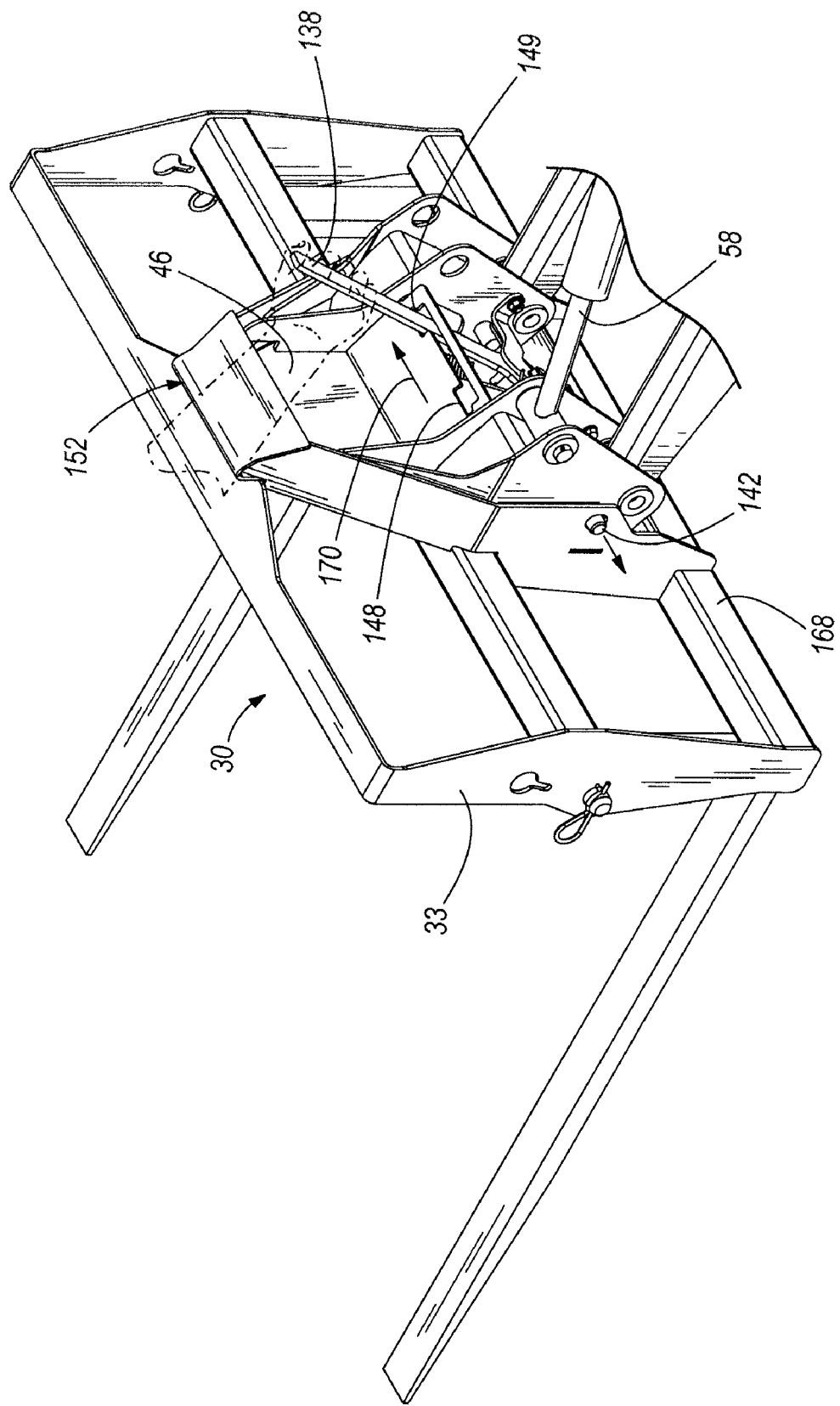

FIGS. 7A, 7B and 7C illustrate interface plate 46 being mounted to a tool 30. In the examples illustrated in FIGS. 7A, 7B and 7C, tool 30 is a pallet fork 33. To begin mounting interface plate 46 to tool 30, interface plate 46 is constrained in an unlocked position as illustrated in FIG. 7A. The unlocked position is clearly indicated by lever 138 being in a position oriented towards the left or within catch feature 148. To proceed with mounting interface plate 46 to tool 30 as illustrated in FIG. 7A, interface plate 46 is tilted forward (in a direction 168 indicated by the arrow) using tilt cylinder 58. After tilting interface plate 46 forward, the work machine is driven towards interface receiving member 152 until top edge 106 of interface plate 46 is under top flange 160 of interface receiving member 152. In FIG. 7B, tilt cylinder 58 tilts interface plate 46 backward until the bottom edge of the tool is slightly off the ground. This motion fully allows interface receiving member 152 to receive interface plate 46. In FIG. 7C, lever 138 is actuated from catch feature 148 toward the right into catch feature 149 (in a direction 170 indicated by the arrow) to lock interface plate 46 to tool 30. By actuating lever 138 from catch feature 148 to catch feature 149, pins 142 extend through apertures 164 on interface receiving member 152. Pins 142 that are extended through apertures 164 provide secure fastening of interface plate 46 to tool 30. To release tool 30 from interface plate 46, the steps are performed in reverse.

Although the present invention has now been described with reference to preferred embodiments, workers skilled in the art will recognize that changes may be made in form and detail without departing from the spirit and scope of the invention.

What is claimed is:

1. A work vehicle comprising:
   a tool having an interface receiving member comprising:
   a planar surface;
   first and second side flanges coupled to the planar surface and having first and second ends, each of the first and second side flanges including an aperture which are in alignment with each other;
   a top flange coupled to the planar surface and extending between the second end of the first side flange and the second end of the second side flange, wherein the first ends of the first and second side flanges are spaced apart from each other a distance greater than a distance between the second ends of the first and second side flanges;
   an interface plate coupled to a lift arm of the work vehicle, the interface plate configured to be received by the interface receiving member, the interface plate comprising:
   a first side edge having a first end and a second end, the first side edge configured to contact the first side flange of the interface receiving member;
   a second side edge having a first end and a second end, the second side edge configured to contact the second side flange of the interface receiving member;
   a top edge coupling the second end of the first side edge to the second end of the second side edge and configured to contact the top flange of the interface receiving member, wherein the first ends of the first and second side edge are spaced apart from each other a distance greater than a distance between the second ends of the first and second side edges;
   a first outer flange coupled to and extending along at least a portion of the first side edge, the first outer flange including an aperture for allowing a first pin to actuably extend and retract there through;
   a second outer flange coupled to and extending along at least a portion of the second side edge, the second outer flange including an aperture for allowing a second pin to actuably extend and retract there through;

wherein the first side edge, the second side edge and the top edge form an integral cylindrical bar that surrounds the interface plate and are configured to engage with and contact the flanges on the interface receiving member; and wherein the interface plate includes a first pin and a second pin, the first pin configured to protrude into the aperture of the first side flange and the second pin configured to protrude into the aperture of the second side flange when the interface plate is locked to the interface receiving member.

2. The work vehicle of claim 1, wherein the distance between the first ends of the first and second side edges is approximately between 2.5 and three times greater than the distance between the second ends of the first and second side edges.

3. The work vehicle of claim 1, wherein the interface receiving member comprises a pocket formed underneath the top flange, the pocket formed by the top flange, the second end of the first side flange, the second end of the second side flange and the planar surface, wherein the pocket is configured to receive the top edge of the cylindrical bar of the interface plate.

4. The work vehicle of claim 1, wherein the interface plate comprises;
a first inner flange positioned between the first outer flange and the second outer flange and in closer proximity to the first outer flange than to the second outer flange; and
a second inner flange positioned between the first inner flange and the second outer flange and in closer proximity to the second outer flange than the first outer flange.

5. The work vehicle of claim 4, wherein the interface plate comprises a locking mechanism positioned between the first inner flange and the second inner flange, the locking mechanism configured to actuate the first pin and the second pin into the protruding position for locking the interface plate to the interface receiving member and configured to actuate the first pin and the second pin into a recessed position for unlocking the interface plate from the interface receiving member.

6. The work vehicle of claim 5, wherein the locking mechanism includes a lever and a spring.

7. The work vehicle of claim 6, wherein upon actuation of the lever, the spring operates to actuate the first pin through the aperture in the first side flange of the interface receiving member and operates to actuate the second pin through the aperture in the second side flange of the interface receiving member.

8. The work vehicle of claim 6, wherein the interface plate comprises a guide plate located between the first inner flange and the second inner flange and having a slot, the slot configured to surround at least a portion of the lever and comprise a first catch feature located at one end of the slot and a second catch feature located at an opposite end of the slot, wherein the first catch feature is configured to retain the lever in an unlocked position and the second catch feature is configured to retain the lever in a locked position.

9. An attachment arm assembly comprising:
a pair of arms having first and second ends, the arms coupled to an arm support and pivotal about an arm pivot axis at the first ends;
an interface plate pivotally coupled to the pair of arms about an interface plate pivot axis at the second ends and configured to mount a tool, the interface plate comprising:
a main body;
a first side edge having a first end and a second end;
a second side edge having a first end and a second end; and
a top edge coupling the second end of the first side edge to the second end of the second side edge, wherein the first ends of the first and second side edge are spaced apart from each other a distance greater than a distance between the second ends of the first and second side edges;
a first outer flange coupled to and extending along at least a portion of the first side edge, the first outer flange including an aperture for allowing a first pin to actuably extend and retract there through;
a second outer flange coupled to and extending along at least a portion of the second side edge, the second outer flange including an aperture for allowing a second pin to actuably extend and retract there through;
wherein the first side edge, the second side edge and the top edge form an integral cylindrical bar that surrounds the main body of the interface plate and are configured to engage with and contact receiving flanges on an interface receiving member coupled to a tool.

10. The attachment arm assembly of claim 9, wherein the distance between the first ends of the first and second side edges is approximately 13.5 inches and the distance between the second ends of the first and second side edges is approximately 4.75 inches.

11. The attachment arm assembly of claim 9, further comprising a first inner flange positioned between the first outer flange and the second outer flange and in closer proximity to the first outer flange than to the second outer flange and a second inner flange positioned between the first inner flange and the second outer flange and in closer proximity to the second outer flange than the first outer flange.

12. The attachment arm assembly of claim 11, wherein the interface plate comprises a locking mechanism positioned between the first inner flange and the second inner flange, the locking mechanism configured to control the first pin that extends outwardly from the first outer flange to mate with a first aperture in a tool and a second pin that extends outwardly from the second outer flange to mate with a second aperture in the tool.

* * * * *